US006938033B1

(12) United States Patent
Schutzer

(10) Patent No.: US 6,938,033 B1
(45) Date of Patent: Aug. 30, 2005

(54) SYSTEM AND METHOD OF USING E-MAIL CENTERED INTERNET INTERACTION

(75) Inventor: Daniel Schutzer, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/409,748

(22) Filed: Oct. 1, 1999

Related U.S. Application Data

(60) Provisional application No. 60/102,976, filed on Oct. 2, 1998.

(51) Int. Cl.$^7$ ............................................. G06F 17/30
(52) U.S. Cl. ..................... 707/3; 707/2; 707/4; 707/10; 715/752; 709/203
(58) Field of Search .............................. 707/1, 10, 100; 345/752; 709/203

(56) References Cited

U.S. PATENT DOCUMENTS

| 5,530,852 | A | | 6/1996 | Meske, Jr. et al. .......... 395/600 |
| 5,649,186 | A | * | 7/1997 | Ferguson .................... 395/610 |
| 5,701,466 | A | | 12/1997 | Yong et al. ................. 395/611 |
| 5,749,079 | A | | 5/1998 | Yong et al. ................. 707/100 |
| 5,752,242 | A | | 5/1998 | Havens ......................... 707/3 |
| 5,752,246 | A | | 5/1998 | Rogers et al. ................ 707/10 |
| 5,765,028 | A | | 6/1998 | Gladden ....................... 395/11 |
| 5,784,608 | A | | 7/1998 | Meske, Jr. et al. .......... 395/602 |
| 5,809,242 | A | | 9/1998 | Shaw et al. ............. 395/200.47 |
| 5,835,087 | A | | 11/1998 | Herz et al. .................. 345/327 |
| 5,850,517 | A | | 12/1998 | Verkler et al. ......... 395/200.32 |
| 5,855,015 | A | | 12/1998 | Shoham ......................... 707/5 |
| 5,873,077 | A | | 2/1999 | Kanoh et al. .................. 707/3 |
| 6,006,217 | A | * | 12/1999 | Lumsden ....................... 707/2 |
| 6,163,779 | A | * | 12/2000 | Mantha et al. .............. 707/100 |
| 6,226,655 | B1 | * | 5/2001 | Borman et al. ............. 707/501 |
| 6,230,156 | B1 | * | 5/2001 | Hussey ........................ 707/10 |
| 6,275,820 | B1 | * | 8/2001 | Navin-Chandra et al. ...... 707/3 |
| 6,334,145 | B1 | * | 12/2001 | Adams et al. .............. 709/217 |

OTHER PUBLICATIONS

Greg, Harvey, Internet Explorer 4 for Windows for Dummies Quick Reference, IDG Books Worldwide, Inc. Copyright 1997.*
Dessloch et al., Integrating SQL Databases with Content-Specific Search Engines, Proceedings of the 23$^{rd}$ VLDB conference Athens, Greece, 1997, pp. 528-536.*

* cited by examiner

Primary Examiner—Shahid Alam
Assistant Examiner—Hung Pham
(74) Attorney, Agent, or Firm—George T. Marcou; Kilpatrick Stockton LLP

(57) ABSTRACT

The present invention allows an e-mail server to process requests for Web pages and forward copies of the requested Web pages as attachments to e-mail messages. In addition to providing copies of a first set of Web pages themselves, the present invention also copies additional Web pages referenced by the links contained in the first set of Web pages into the e-mail messages so that the user may read the copies of the additional Web pages using the features and capabilities of a Web browser. The requests are generated by using a search engine or by requesting a specific Web page from a previously copied and linked Web page. The user may thus request Web pages and then go off-line and wait for the results to be returned to him/her as attachment(s) to e-mail message(s).

5 Claims, 5 Drawing Sheets

SYSTEM AND METHOD OF USING E-MAIL CENTERED INTERNET INTERACTION

This application claims priority to U.S. provisional application No. 60/102,976 filed on Oct. 2, 1998, which is incorporated herein by reference.

FIELD OF THE INVENTION

This invention relates to a system and a method of using an e-mail system that retrieves Web pages and links to Web pages-and returns them to a user in an e-mail message. The present invention allows the user to view a Web page as well as the Web pages attached to that Web page via links, even if the user is not currently connected to the World Wide Web.

BACKGROUND OF THE INVENTION

It is estimated that the Internet industry is growing at a rate of 40% to 50% per year and will include 90 million hosts by the year 2000. The surge in Internet use may be partly attributable to the increasing number of computers in the home and the capability of users to log onto the Internet from home. According to recent statistics, the most common Internet activities remain e-mail and World Wide Web ("Web") browsing, with most users citing e-mail as the most important application. Today's e-mail programs also send and receive graphics, sound clips and Web page attachments as easily as they send plain text messages.

While the Web provides numerous sources of information on thousands of topics, one disadvantage is that the use of the Web requires that the user be on-line. Being on-line typically requires a user to use a modem to connect his/her personal computer (PC) to an Internet Service Provider (ISP). The user then obtains Web access through the modem/ISP connection. Maintaining this type of connection for long periods of time is undesirable for dial up users who must tie up their phone lines while downloading and viewing Web pages.

Another disadvantage of using the Web is that it is passive and requires the user to search its contents to locate desired information. If the user does not know on which Web page the desired information or service resides, he/she needs to search the web for applicable Web pages. This search may prove to be burdensome and is often time consuming for the user. Thus, if a user is using a dial-up modem/ISP connection to the Web, he/she or she will again tie up the phone line for a protracted period of time while he/she formulates a search query and then reviews the returned Web sites for the desired information.

This problem of needing to be on-line also involves obtaining updated information from the Web. If a user desires to see particular Web pages on a periodic basis, such as on a newspaper based Web site, he/she must get on-line, request the desired information and then download the desired Web pages.

Unlike the Web, e-mail actively distributes selected information to the user without requiring the user to initiate the request or search. In addition, e-mail services are more proactive than Web based services, and do not require the user to interact in a more reactive mode.

Another advantage of e-mail is that it does not require the user to maintain an on-line connection while viewing, downloading or responding to e-mail messages. Thus, the user simply establishes an on-line connection to a conventional e-mail server, collects his/her e-mail messages and stores them locally. Once the e-mail messages are stored on a client e-mail device, the user may review them at his/her leisure while off-line from the conventional e-mail server.

One disadvantage of conventional e-mail systems is their inability to actively retrieve Web pages via existing links in Web pages when the mail is being reviewed off-line. For example, while a user may send an e-mail message to another that includes a copy of a Web page as an attachment, the recipient cannot follow the links within the attached Web page to review subsequent Web pages. The conventional method for sending a plurality of Web pages requires sending copies of all the desired Web pages as attachments that are manually selected by the sender of the e-mail message. The recipient must open each copied attachment one by one using a Web browser. The recipient cannot use the links in the Web page to flip between the plurality of attached Web pages. This means that the sender must manually select each individual page, copy it as an attachment to an e-mail message and send it to the recipient. Neither the sender nor the recipient can use the conventional e-mail systems to request and retrieve Web pages for them and forward these Web pages to themselves as part of an e-mail message.

SUMMARY OF THE INVENTION

The present invention distinguishes from prior art Web browsers and e-mail programs in two ways. First, it has the capability to automatically download the pages referenced by a link in an attached Web page to an e-mail message. This capability includes copying the Web page at the end of the link such that it is possible to include an entire Web site with all its internally referenced pages into one e-mail message. The recipient need only use his Web browser in conjunction with the e-mail system of the present invention to view all of the attached Web pages via the copied links. In other words, the recipient may view an entire Web site, if all the pages are attached, using the links embedded in each Web page and the Web browser in a manner similar to conventional Web page viewing without needing an on-line connection to the Web.

Another feature of the present invention is the user's ability to request searches to be performed over the Web as an e-mail request to the enhanced e-mail server and have the results of the search be returned to the user as an e-mail with copies of linked Web pages as attachments to the e-mail message. Thus, the user may establish an e-mail-initiated search request and receive the results as attachments to e-mail messages without needing to establish a direct, on-line connection to the Web.

This retrieving and searching off-line also gives the user another advantage. It allows him/her to reduce his/her time on the phone connection if he/she is using a dial-up service and modem. If the user is paying time-based connection charges to access the Web, he/she will be charged for waiting for an on-line Web-based search to be completed. This would not be the case with an off-line search such as described above. Additionally, if the user has only one phone-line in his/her home, he/she will be unable to receive calls while he/she waits for an on-line Web-based search to finish. The present invention allows the user to have his/her enhanced e-mail server gather the "hit" Web pages (Web pages found to satisfy the user's search criteria) into e-mail messages while disconnected from the Web and thus free up his/her telephone line for incoming calls.

Another advantage of the present invention is the inherent saving capabilities within an e-mail program. E-mail messages are either saved for a short period of time or until the user deletes the messages depending on the e-mail application. Thus, by integrating Web capabilities with e-mail capabilities, a user will be able to save his/her search results and retrieved Web pages and links via the inherent saving of messages of the e-mail program. This eliminates repeating searches and also allows the user to go through his/her search results a few messages at a time knowing that those pages and links not "read" but downloaded with the e-mail in a particular message will be there stored on his/her local client for later reading. In other words, an e-mailed search today may be read tomorrow with all of the retrieved Web pages and links.

Another advantage of the present invention is the capability for the user to specify the depth of Web pages he/she wishes to receive. Each Web page references other Web pages and the depth refers to how far down this reference chain one Web page is from another. Thus, a number of linked Web pages are retrieved and returned as attachments to an e-mail. A user may only desire to have the present invention provide him with a home page and the pages directly linked to it. The user may not be interested in receiving the pages separated from the home page by an intermittent page. Thus, the user may establish the depth of Web pages to be returned as attachments to the e-mail message.

The present invention also allows for follow-up retrievals. This is accomplished by opening an e-mailed Web page and reviewing the content therein. Links to non-retrieved pages still have their respective link icons shown, but they appear in a shadow or alternative form that indicates they are not immediately available to the user at that moment. Clicking on the icon generates an automatic e-mail request to the enhanced e-mail server. The action of clicking invokes the enhanced e-mail server to retrieve the desired Web page and any links or Web pages associated with that page, encapsulate the retrieved Web pages and links in an e-mail message, and forward the message to the e-mail client.

Upon viewing this page, the user may decide to seek information that was not retrieved in his/her initial request. For instance, after viewing the home page of a particular Web merchant, the user may decide to purchase some of the merchandise shown on the page. If the order form is on a non-retrieved link, all the user would need to do is click or attempt to retrieve the desired non-retrieved link icon in some manner. This would automatically generate a retrieval request to the enhanced e-mail server. The enhanced e-mail server understands this action to be a request for an additional retrieval. The enhanced e-mail server retrieves the requested previously non-retrieved pages and forwards them to the user in a new e-mail. Conventional e-mail systems do not have this capability. More particularly, since conventional e-mail systems only contain copies of retrieved and attached Web pages, should a user of the conventional e-mail system desire to retrieve non-retrieved information (i.e., another Web page) while reading his/her e-mail off-line, he/she will have to go on-line, invoke the Web browser to directly retrieve the original Web page and follow its links. Similarly, to perform a Web search on a conventional system, the user would have to be on-line, linked to a search engine, and use the search engine to formulate his/her own search query. In either case, both methods require the user to go through considerable steps to retrieve the desired information.

The present invention is particularly attractive for portable consumer information devices that consumers carry with them while traveling. In this case the consumers often prefer to download their e-mail messages and Web pages for later viewing while off-line rather than maintaining a continuous on-line connection.

This capability is also useful in a home, or campus environment, where the home configuration consists of a server connected to a number of specialized information appliances placed around the house. The local home server would be the client receiving the downloaded e-mail and Web pages that are accessed locally by the information appliances placed at various locations around the home. The retrieval from the net by the local server can be done during off-hours and the user can then access his/her e-mail from the local server over the local net at much faster response times.

DETAILED DESCRIPTION OF THE INVENTION

Figure 1:
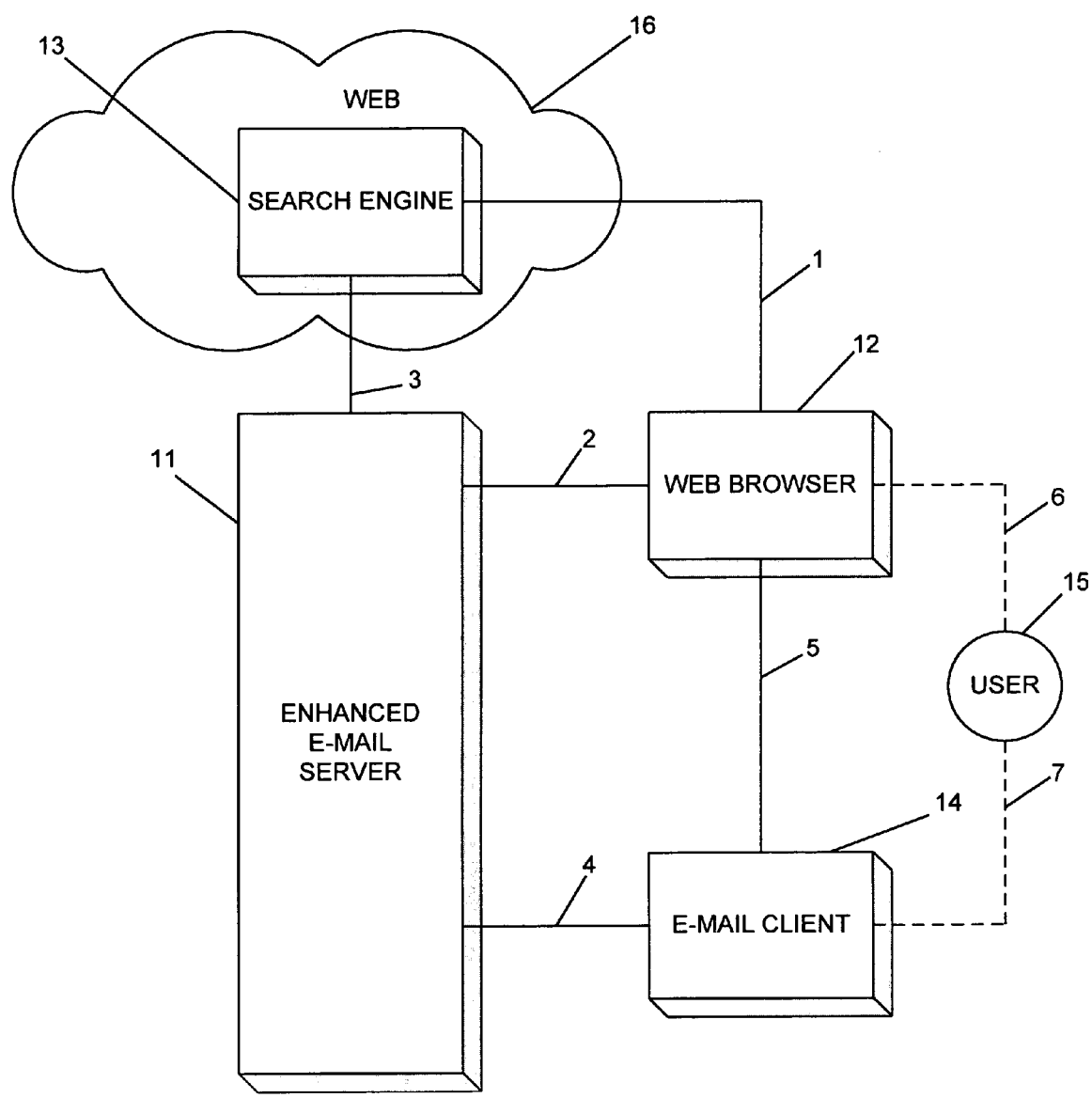
FIG. 1 is a block diagram of the various applications used in an embodiment of the present invention.

FIG. 1 shows a system employing a first embodiment of the present invention such that a user 15 may collect information from the Web and have it forwarded to himself or herself via an e-mail message. The user 15 employs the enhanced e-mail server 11 that is integrated with the user's Web browser 12, search engine 13 and e-mail client system 14. The overall system operates by having the enhanced e-mail server 11 operate together with the Web browser 12 and search engine 13 so that desired Web pages are forwarded to the user's e-mail client system 14. Additionally, the enhanced e-mail server 11 monitors the reading of e-mail messages within the e-mail client system 14 such that messages, which contain Web page information and which have non-retrieved sites and pages, can be retrieved immediately using a Web browser if the user is on-line; or if the user is off-line, an e-mail request is generated to be sent to the enhanced e-mail server to retrieve the previously non-retrieved sites and pages to forward them in an additional e-mail message, should the user 15 desire to view those links to non-retrieved sites and pages.

The system shown in FIG. 1 operates by passing the relevant information, either a request for data or a Web page itself, via paths 1–4. Path 1 is utilized in a normal Web browsing in a conventional manner. User 15 uses Web browser 12 to either retrieve a Web page directly from Web 16 via path 1 by typing in the desired Uniform Resource Locator (URL) or by accessing a search engine 13, typing in a phrase or term for searching and using the return hit list to access those Web pages. In the example shown in FIG. 1, search engine 13 is shown as part of the Web 16 as it is typically accessed via a page on the Web. In this application, the user interfaces directly with the Web 12 via path 6.

In accordance with a preferred embodiment of the present invention, user 15 may also access and read Web pages via e-mail client/server combination 11 and 14. As noted above, the enhanced e-mail server 11 issues requests for Web pages, links and Web pages accessed by links via path 3 and receives those Web pages and links via path 3. The enhanced e-mail server 11 either forwards the Web pages directly to the Web browser via path 2 or it forwards the Web pages in e-mail messages to e-mail client 14 via path 4 which then forwards them to Web browser 12 via path 5 for viewing by user 15. In this implementation, user 15 uses Web browser 12 via e-mail client 14 so that user has the features of the e-mail application but is still able to review the Web page using the Web browser 12. Thus, user 15 views the Web page through e-mail client 14 on path 7. Like path 6, path 7 is one option for viewing Web pages that is separate and distinct from the option using path 6.

In a preferred embodiment of the present invention, Web browser 12 and e-mail client 14 are installed in the user's home PC or laptop. The home PC or laptop is preferably a Pentium® or Mac® based computer. Enhanced e-mail server is part of an ISP and paths 1,2 and 4 are one phone connection line through a Plain Old Telephone Service ("POTS") line.

Figure 2:
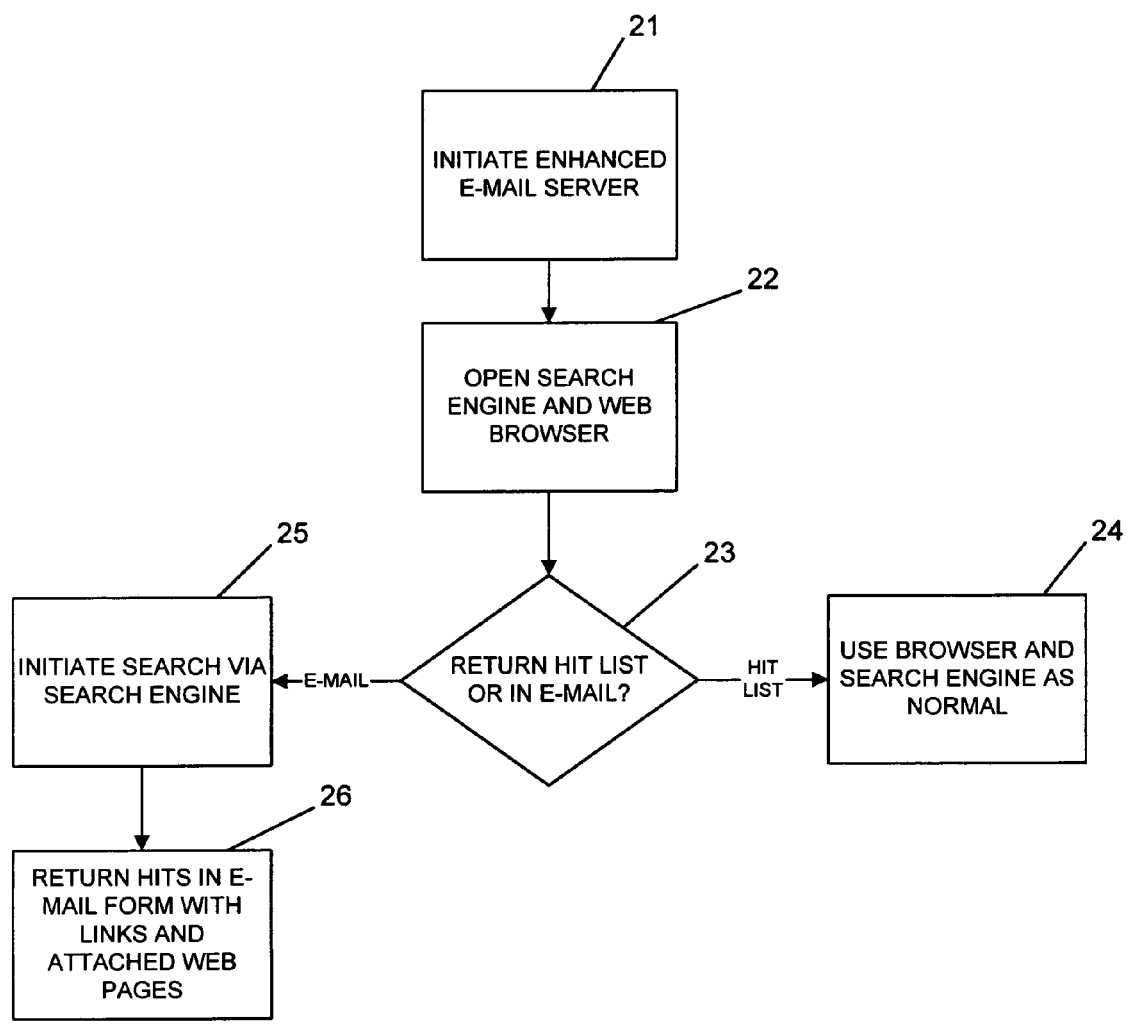
FIG. 2 is a flow chart showing the process for Web browsing utilizing an embodiment of the present invention.

FIG. 2 shows the process in which a user receives Web information via an e-mail message according to an embodiment of the present invention, using the elements shown in FIG. 1. The user begins by invoking the enhanced e-mail server 11 via the client e-mail 14 with a search request e-mail at step 21.

Figure 5:
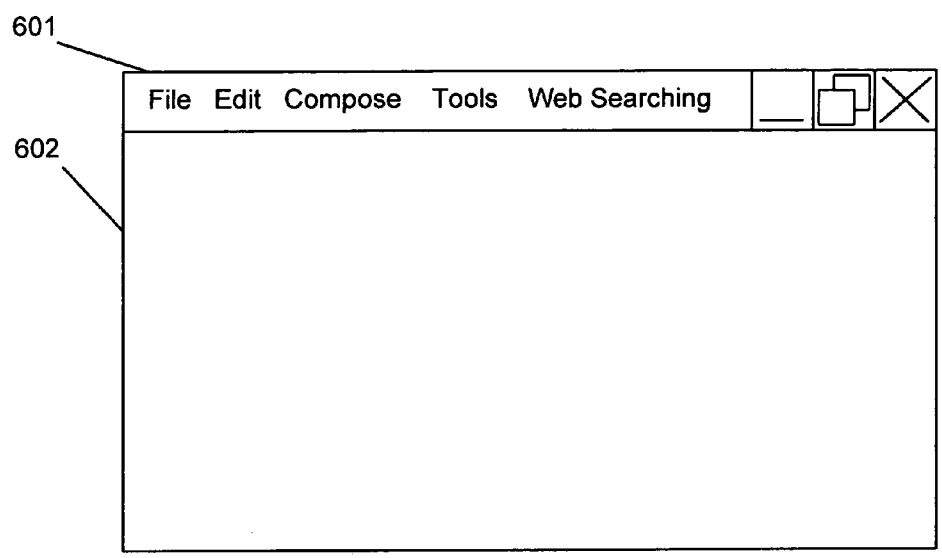
FIGS. 5 and 6 are screen shots of an embodiment in accordance with the present invention.
Figure 6:
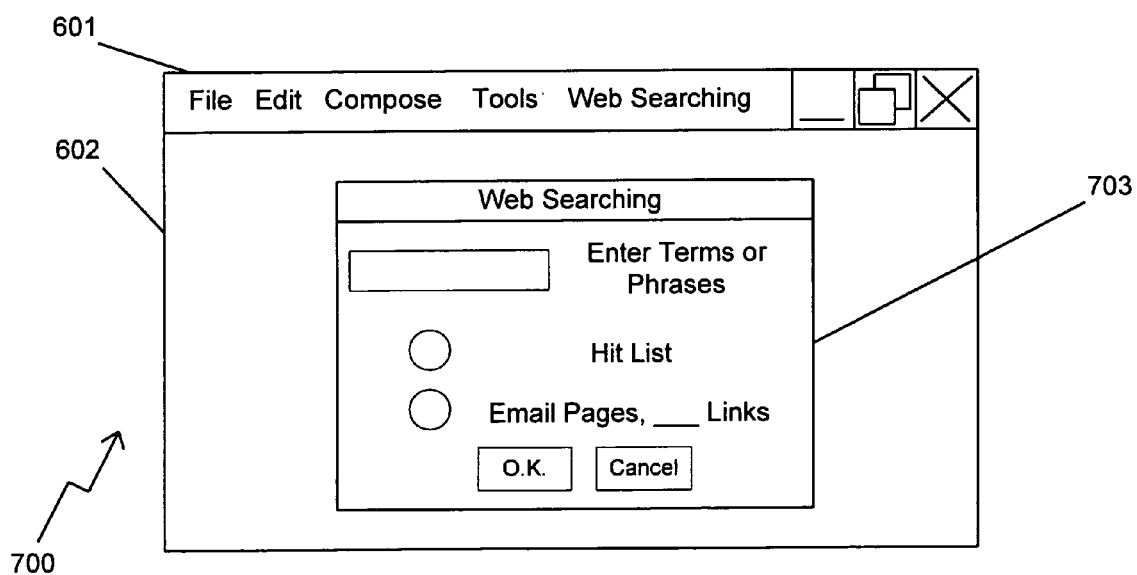

Examples of screens user 15 uses to begin this process are shown in FIGS. 5 and 6. More specifically, user 15 hits the "Web Searching" area of toolbar 601 of screen 600 shown in FIG. 6. Client e-mail 14 responds by displaying pop-up window 703 and enhanced e-mail server 11 logs on to the Web. As described before, this log on process usually involves an Internet Service Provider (ISP). Once logged on, the enhanced e-mail server opens the search engine 13 and the Web browser 12 at step 22. Part of pop-up window 703 is prompting user 15 on whether he/she wishes to receive the desired Web pages as part of a hit list or bundled in e-mail messages at step 23. If the user desires a standard search engine hit list, the search engine will supply it at step 24. Step 24 is an indication that the user does not want to take advantage of the present invention's e-mail capabilities. Depending on the exact implementation of the present invention, the e-mail server 11 and client 14 may shut down and pass the user off to the Web browser or the e-mail functionality may remain open so that user 15 may use them as a conduit for the displayed Web pages.

Should the user decide to receive the search engine's hits in e-mail format at step 23, the user enters his/her search terms at step 25, activates the button indicating his/her desire to receive the search results via e-mail and enters the number of links he/she wishes to receive. To better understand this concept, reference is made to FIG. 4 which is a representation of Web pages and links between the Web pages.

Figure 4:
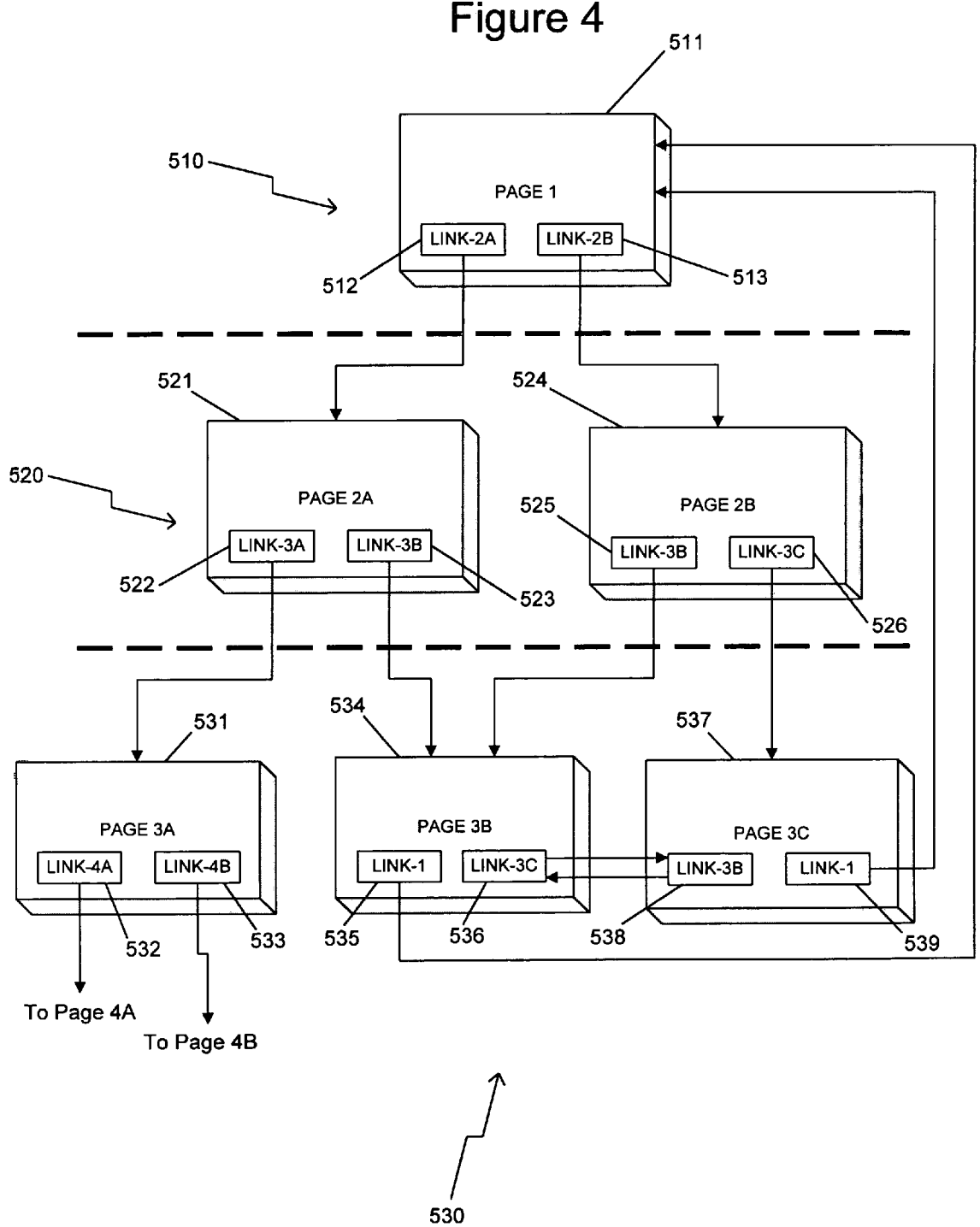
FIG. 4 is a block diagram of a plurality of Web pages interconnected via a plurality of links.

In FIG. 4, three levels of Web pages are shown as an example. Page 511 is called "Page 1" and is a home page or a starting page. In a Web site that contains many pages, this is generally considered the first page through which all other pages are accessible via the links. Link 512 goes from level 510 to level 520 and allows user 15 to view page 521, called "Page 2A," from page 511. Links 513, 522, 523, 525, 532 and 533 similarly link a page from an upper level with a page on a lower level. Links 536 and 538 link pages together on the same level while links 535 and 539 link pages on a lower level with pages on a higher level. It should be appreciated that "level" is only used to describe the fact that one Web page contains a link to another Web page such that pages 534 and 537 can also be described as being on two different levels via links 536 and 538.

When the search engine has completed its search at step 25, the enhanced e-mail server 11 receives the search engine's hit list and uses the Web browser 12 to retrieve pages from the hits at step 26. As the Web browser returns pages to the enhanced e-mail server at step 26, the enhanced e-mail server makes copies of those pages and links leading to embedded hit pages (e.g. pages that also contain information beneath the home page). The following of the link to another page is accomplished by the enhanced e-mail server recognizing a link from the special code used to designate a link within a Web page and issuing a request for that page using the URL associated with that link. A counter (not shown) is used to count how many levels of pages are retrieved and copied so as to return the correct number of Web pages as requested by the user. By going through this process, the enhanced e-mail server 11 has created a mini-copy of some of the pages and links within a hit Web site.

Once the enhanced e-mail server has collected copies of pages and links from a single Web site, it encapsulates them into a single e-mail message and forwards the e-mail message containing those page copies and link copies to the e-mail client at step 26. Thus, the user may view these pages as an e-mail message upon receipt at e-mail client 14.

With the first example shown in FIG. 4, user 15 enters a search request with a depth of "2" via pop-up window 703. The resulting e-mail will contain copies of Web pages 511, 521, 524, 531, 534 and 537 and links 512, 513, 522, 523, 525, 526, 532, 533, 535, 536, 538 and 539. Some links will directly refer to pages while others will not but will instead be shadow links as described later.

Figure 3:
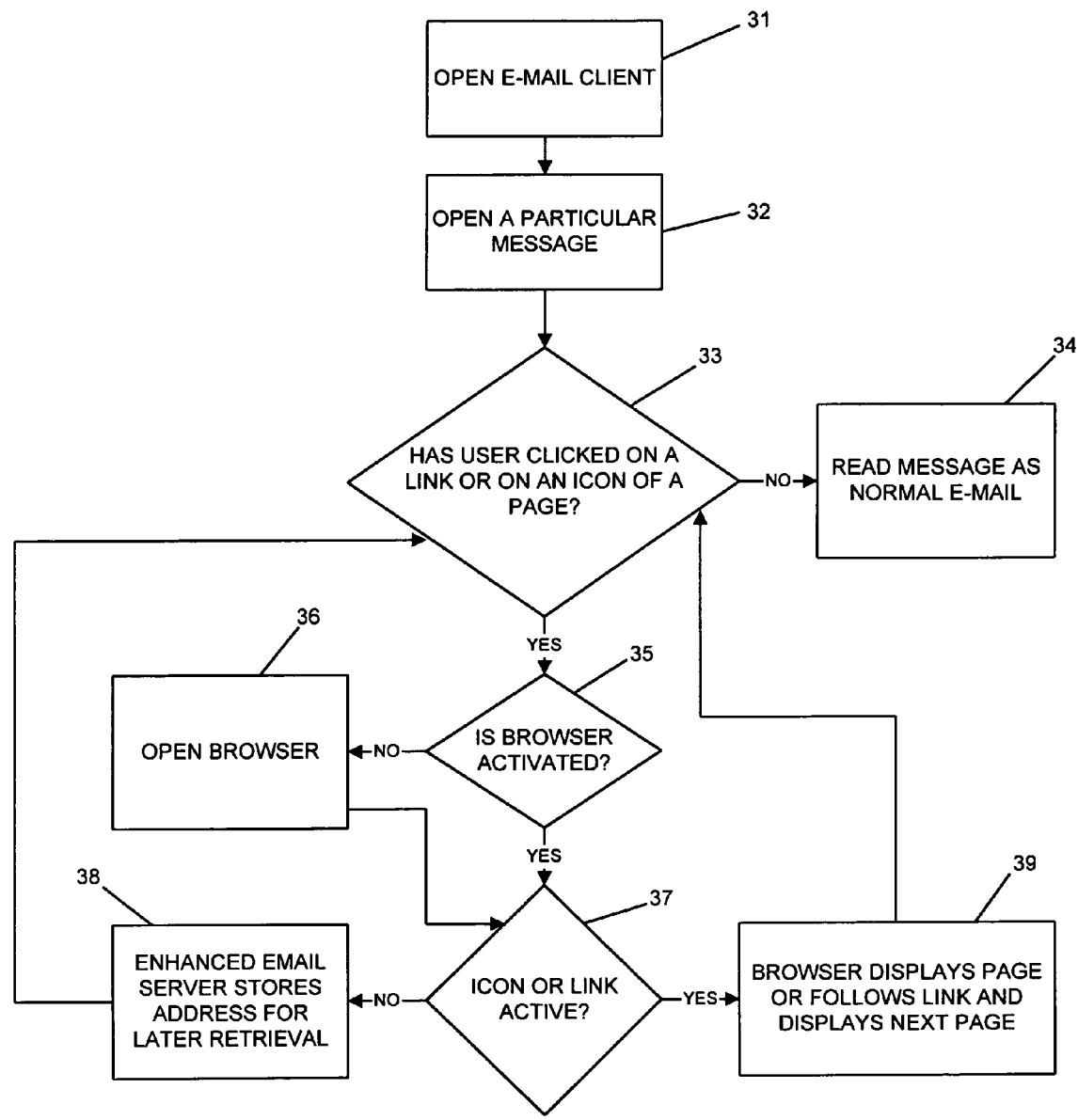
FIG. 3 is a flow chart showing the process for reading copies of Web pages sent as an e-mail message according to an embodiment of the present invention.

FIG. 3 shows how a user views his/her e-mail messages when the e-mail message contains copies of Web pages and links according to an embodiment of the present invention. At step 31, the user opens his/her e-mail client 14. Typically, the e-mail client 14 provides the user with a list of e-mail messages that have been pushed onto it by the enhanced e-mail server 11. In a typical application where the user uses the ISP to provide e-mail services, the user must establish an on-line connection between e-mail client 14 and enhanced e-mail server 11 to retrieve new e-mail messages not yet forwarded to e-mail client 14. However, once the e-mail messages are forwarded to e-mail client 14, the user may terminate the on-line connection. The user then need only select a particular message, open it and read the information contained therein at step 32. At step 33, the e-mail client 14 determines if the user either clicks on a Web page icon or a link icon or does not. If the user does not click on a page or link icon that was returned at step 26 of FIG. 2, then the e-mail client 14 provide the message normally to user 15 at step 34. It should be noted that this includes the current practice of having attachments to the message, where the attachments may be documents, Moving Pictures Expert Group ("MPEG"), sound bits, or copies of Web pages. Current e-mail applications, however, do not attach linked Web pages to the e-mail, but instead invoke a browser to retrieve a link if on-line. Using the example Web pages of FIG. 4, if user 15 only receives Web page 511 as an attachment to an e-mail message, he/she is unable to access pages 521 and 524 via links 512 and 513. Therefore, when not on-line, a current e-mail server cannot retrieve the Web page. With the enhanced e-mail server of the present invention, the linked Web pages are automatically transmitted in the e-mail message.

If the user is off-line and clicks on a page icon or a link icon at step 33, the e-mail client 14 determines if the Web browser is currently operating at step 35. If it is not, the Web browser is activated at step 36. At step 37, the e-mail client 14 determines if the page or link icon clicked on by the user in step 33 was previously retrieved and attached to the e-mail message or not. If the page or link is not highlighted, but is a shadow, this means that the e-mail message does not contain a downloaded copy of that page and/or a copy of the link to the next page. A shadow icon appears on the monitor, but it is in a different form (e.g., lighter) than icons for pages and links that are active.

If the user clicks on a non-retrieved page icon, or link icon that was not previously retrieved and attached to the message in step 33, and the user is on-line, the Web browser is invoked and the page is retrieved. If the user is off-line, the e-mail client 14, composes and forwards a message containing the address of that page or link at step 38 to the enhanced e-mail server 11. The next time the client connects to the server, the server will receive the message requesting the Web page. The enhanced-mail server 11 at step 40 will retrieve the additional requested pages and links and then have copies of them forwarded to the e-mail client 14 as an e-mail message at step 21 of FIG. 2. After the user 15 has requested a copy of that Web page via the shadow link, the process returns to step 33 where the user 15 may click on another link.

If the link is active (i.e., not shadowed) when the user clicks on it at step 33, then the e-mail program 14 uses Web browser 12 to view the page or advance to the next page via the provided link at step 39. This procedure appears to the user as a normal Web browsing function as the user goes forward and backward over the copied and/or retrieved pages within the e-mail message. After user 15 views that Web page, the process returns to step 33, where user 15 may click on another link.

FIG. 3 may also be implemented when user 15 remains on-line while reading the e-mail messages via e-mail client 14. If on-line, the answer to the question at step 37 is a "Yes" by default since the next desired page is either retrieved from the e-mail message or is instead retrieved from the Web. Thus, even if a link is a shadow link, Web browser 12 may still retrieve the desired Web page at step 39.

While the invention has been described with reference to specific examples, it is understood by those of ordinary skill in the art that many variations are also possible without departing from the scope as established by the appended claims.

What is claimed is:

1. A computer-implemented method of attaching at least one Web page to an e-mail message comprising:
   receiving at least one search term via e-mail;
   issuing a search request to a processor-based search engine using the at least one search term;
   receiving a hit list from the search engine;
   retrieving at least one Web page from the hit list;
   bundling a copy of the at least one Web page into an e-mail message;
   forwarding the e-mail message to an end-user's terminal wherein the copy of the at least one Web page reviewable by the end-user;
   receiving a number representative of a depth in which the depth is the number of successive links to another Web page as accessed through the at least one Web page; and
   bundling a copy of each of the successive links between the other Web page and the at least one Web page into the e-mail message.

2. The computer-implemented method of claim 1, wherein the copy of the at least one Web page bundled in the e-mail message reviewable by the end-user when the end-user's terminal is not connected to the Web.

3. The computer-implemented method of claim 1, wherein the bundled at least one Web page includes a link to a non-retrieved Web page, wherein the non-retrieved Web page can be retrieved directly via connection to the Internet.

4. The computer-implemented method of claim 3, wherein the non-retrieved Web page can be retrieved upon receiving another search term and issuing another search request to the search engine using the another term.

5. A computer readable medium on which is encoded program code, the program code comprising:
   program code for receiving at least one search term via e-mail;
   program code for issuing the at least one search term as a search request to a search engine;
   program code for receiving links to a plurality of Web pages that are associated with the at least one search term;
   issuing a request for at least one of the plurality of Web pages;
   receiving the at least one Web page;
   program code for automatically copying the at least one Web page into at least one e-mail message;
   program code for automatically forwarding the at least one e-mail message to a remote terminal;
   program code for receiving a number representative of a depth in which the depth is the number of successive links to another Web page as accessed through the at least one Web page; and
   bundling a copy of each of the successive links between the other Web page and the at least one Web page into the at least one e-mail message.

* * * * *